(12) United States Patent
Cohen

(10) Patent No.: US 7,046,956 B1
(45) Date of Patent: May 16, 2006

(54) MESSAGING AND PROMOTION FOR DIGITAL AUDIO MEDIA PLAYERS

(75) Inventor: Marc S. Cohen, Lincolnwood, IL (US)

(73) Assignee: 67 kHz, Inc., Evanston, IL (US)

( * ) Notice: Subject to any disclaimer, the term of this patent is extended or adjusted under 35 U.S.C. 154(b) by 951 days.

(21) Appl. No.: 09/590,489

(22) Filed: Jun. 9, 2000

(51) Int. Cl.
    *F04H 7/00* (2006.01)
(52) U.S. Cl. .................. 455/3.06; 455/3.01; 455/3.05; 369/6; 369/7
(58) Field of Classification Search ............... 455/344, 455/345, 346, 186.1, 66.1, 45, 566, 556.1, 455/557, 412.1, 414.1, 414.3, 422.1, 2.01, 455/3.06, 550.1, 575.1, 424, 425, 561, 3.05, 455/3.01, 577; 379/88, 118, 22, 67, 74, 76, 379/87, 90.1, 101.01, 101.1, 89, 102.03, 379/201, 457, 88.17, 88.11, 88.1; 709/225, 709/226, 229, 14, 16; 386/46, 55, 59; 369/7, 369/2, 30.08, 30, 19, 178.01, 83, 5.15, 7.2, 369/85, 6, 12, 15, 47; 705/14; 340/825.44, 340/825.47, 825.52; 725/35, 22–28, 32, 725/62–63, 74, 86, 105, 135, 143, 153; 381/29–39, 381/51, 15; 370/313, 110.4, 110.1, 111; 707/501

See application file for complete search history.

(56) References Cited

U.S. PATENT DOCUMENTS

| | | | |
|---|---|---|---|
| 3,882,538 A | 5/1975 | Lowe | |
| 4,517,562 A | 5/1985 | Martinez | |
| 4,805,217 A * | 2/1989 | Morihiro et al. | ............ 704/211 |
| 5,105,184 A | 4/1992 | Pirani et al. | |
| 5,265,083 A | 11/1993 | Ishii et al. | |
| 5,274,617 A | 12/1993 | Terashima et al. | |
| 5,392,265 A | 2/1995 | Takezawa | |
| 5,404,566 A | 4/1995 | Wehrmeyer | |
| 5,414,684 A | 5/1995 | Nonaka et al. | |
| 5,524,051 A | 6/1996 | Ryan | |
| 5,600,366 A | 2/1997 | Schulman | |
| 5,740,549 A | 4/1998 | Reilly et al. | |
| 5,751,806 A | 5/1998 | Ryan | |
| 5,774,431 A | 6/1998 | Bos et al. | |
| 5,809,472 A | 9/1998 | Morrison | |
| 5,815,671 A | 9/1998 | Morrison | |
| 5,867,457 A | 2/1999 | Parvulescu et al. | |
| 5,946,664 A | 8/1999 | Ebisawa | |
| 5,956,629 A | 9/1999 | Morrison | |
| 5,991,374 A * | 11/1999 | Hazenfield | ............. 379/101.01 |
| 6,006,076 A | 12/1999 | Nakamura | |

(Continued)

*Primary Examiner*—Edward F. Urban
*Assistant Examiner*—Charles Chow
(74) *Attorney, Agent, or Firm*—Greer, Burns & Crain, Ltd.

(57) ABSTRACT

Messaging, such as promotional messaging, is delivered to users of digital audio media players, such as digital disc and tape players. Portable players are especially suited for practice of the invention. Players include a wireless receiver to receive messages and memory for storage of messages. Alternatively, player memory is preloaded with messages. A controller plays messages at reasonable times, e.g., at breaks between tracks of the audio disc or tape being played. Advertising or promotional messages are broadcast to capable digital audio players via wireless transmission and stored in memory. The player reads control information on the disc and stores it in memory. The control information is used to play messages from memory. An effective promotion method is enabled through the invention and use of a player capable of message reception, storage and play in accordance with the invention.

23 Claims, 8 Drawing Sheets

U.S. PATENT DOCUMENTS

| | | |
|---|---|---|
| 6,011,537 A | 1/2000 | Slotznick |
| 6,011,760 A | 1/2000 | Fleming, III |
| 6,018,649 A | 1/2000 | Rühl |
| 6,041,023 A * | 3/2000 | Lakhansingh ................... 369/7 |
| 6,243,328 B1 | 6/2001 | Fenner et al. |
| 6,272,127 B1 | 8/2001 | Golden et al. |
| 6,311,011 B1 * | 10/2001 | Kuroda ........................ 386/46 |
| 6,463,585 B1 * | 10/2002 | Hendricks et al. ............ 725/35 |
| 6,647,417 B1 * | 11/2003 | Hunter et al. ................ 709/225 |
| 6,721,489 B1 * | 4/2004 | Benyamin et al. ............ 386/46 |
| 6,728,167 B1 * | 4/2004 | Robbins ........................ 369/2 |
| 2003/0182184 A1 * | 9/2003 | Strasnick et al. ............. 705/14 |

\* cited by examiner

MESSAGING AND PROMOTION FOR DIGITAL AUDIO MEDIA PLAYERS

FIELD OF THE INVENTION

The primary fields of the invention are messaging, promotion and digital audio media players.

BACKGROUND OF THE INVENTION

Digital media players are a widely used form of audio reproduction. In the home, players that play CDs (compact discs) are widely used, and more recently DVD (digital versatile disc) players capable of playing CDs serve the joint function of video and audio playback. Portable audio disc players are also used by many persons on a regular basis. The disc players typically play CDs (compact discs) or MDs (mini discs). Digital audio tape (DAT) players exist, but are used less frequently. The CD format is currently the most popular digital audio format.

A pre-recorded CD or MD contains control code information concerning the audio tracks recorded onto it. The control code information is recorded on channels separate from the main audio channels. Control code information includes Table of Contents (TOC) information. The TOC is recorded at the beginning of the disc in a lead-in area. TOC data is also known as mode 1 of a "Q" channel. TOC information includes: number of tracks, absolute starting time of each track, track number, index numbers within a track, time within a track, and absolute time. Other control code information is recorded in a "P" code channel. The P channel contains a flag bit that designates the start of a track. The length of a start flag is a minimum of two seconds, but equals the pause length between two tracks if this length exceeds two seconds. More generally, digital audio media of any form can be expected to have control code information concerning, at least, track starting locations.

SUMMARY OF THE INVENTION

The present invention makes use of such information as a means to provide messaging and promotion to users of digital audio media players, and is especially suited to provide messaging to users of portable digital audio media players, such as digital disc and tape players. Track start locations provide sufficient information for use of the basic invention, while preferred optional features may be realized with digital media formats including additional information.

The present invention provides messaging, such as promotional messaging, to users of portable digital audio media players. Players include a wireless receiver to receive messages and memory for storage of messages. Alternatively, the memory may be pre-loaded with messages. A controller then plays messages between tracks of the audio disc, tape or other form of digital media being played.

In a preferred method, advertising or promotional messages are broadcast to capable digital audio media players via wireless transmission and stored in memory. The player reads control information on a medium and stores it in memory. The control information is used to play messages from memory at predetermined times, preferably between tracks. In a preferred embodiment, a player's micro controller creates and saves a Message Play Plan, utilizing the control information and information about messages stored in memory. The Message Play Plan controls when messages will be played between tracks and how many messages will be played. The Message Play Plan is executed while the digital medium is played.

An effective promotion method is enabled through the invention and use of a player capable of message reception, storage and play in accordance with the invention. A promoter can arrange for the distribution of players, for free or at a reduced cost. An event, e.g., a festival or concert, provides a preferred circumstance to target a particular group of recipients of promotional or advertising messages. Promotional messaging that preferably comprises advertising is then broadcast to the distributed players, which store and play messages between tracks.

BRIEF DESCRIPTION OF THE DRAWINGS

Other features and advantages will become apparent upon reading the following detailed description in which.

DETAILED DESCRIPTION OF THE PREFERRED EMBODIMENTS

Figure 1:
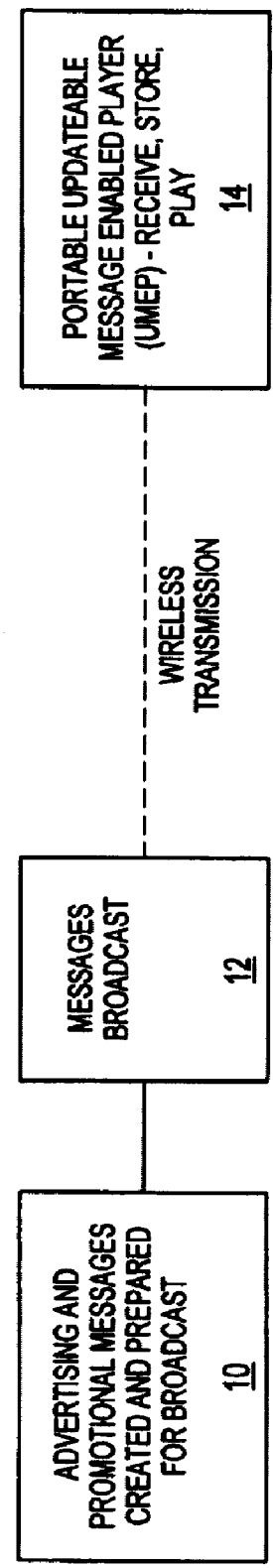
FIG. 1 is a block diagram illustrating preferred wireless messaging according to the invention.

The invention provides messaging to users of portable digital audio devices. Digital media audio devices, e.g., CD or MD players, used by the invention must be modified from conventional devices to be capable of storing and playing messages at predetermined times during playback of digital media. Preferably, the devices are also modified to be capable of receiving messages to be stored and played back.

The preferred digital media audio devices of the invention receive messaging by wireless signal transmission. This permits the messaging to vary as a function of time, geographic location, the reception frequency of the device, or channel selection, for example. Many types of wireless signaling methods may be used in accordance with the invention. Radio frequency transmissions provide a convenient medium for transmission of messaging to digital media audio devices of the invention. The new digital television (DTV) signals are also expected to provide bandwidth for data broadcasts which could be used for messaging. Other suitable wireless media include microwaves, infrared light, laser light and sound waves. Irrespective of the particular manner of wireless transmission selected, modulation and coding techniques add channels which can be utilized by the invention to provide different messaging to different digital media audio devices, or to enable a particular digital media audio device of the invention to select between multiple messaging channels. Pre-loading messages into device memory also is effective for messaging, but does not permit the convenient updating of messages provided by wireless reception.

A portable digital audio media player, e.g., a disc player, equipped to receive store and play messages according to the invention will be referred to herein as an Updateable Message Enabled Player (UMEP). A UMEP may be pre-programmed to a particular messaging channel. UMEPs having different reception channels may be distributed to different targeted groups of message recipients.

A preferred embodiment of the invention uses commercial AM or FM radio subcarrier signals as messaging channels. The remaining portion of the detailed description will be directed to the preferred embodiment. Artisans will appreciate that other wireless signals may be used in a like manner, however.

The preferred sub-carrier channel is outside the baseband of commercial FM or AM transmission and provides a practical means for broadcasting messaging content to handsets. The Subsidiary Communications Authority, also known as a sub-carrier, sideband, SCA band, or SCA (sub-carrier) is a separate, nonbaseband audio or data signal which is multiplexed onto the carrier (baseband) audio signal over a broadcast FM or AM radio station. Radio stations typically dedicate transmission power to one or two sub-carrier channels in addition to their main signal. No FCC authorization, notice, or application of license is required by the broadcast station to transmit a sub-carrier signal. 47 CFR § 73.127 (AM stations), 47 CFR 73.293 (FM stations). FM subcarriers are required to be in the 20 to 99 kHz range when monophonic programs are broadcast and in the 52 to 99 kHz range when stereophonic programs are broadcast.

The preferred type of message content is promotional, e.g., advertisement messages. These messages might include samples of music. It is contemplated, however, that other types of promotional, informational or instructional messages may be broadcast such as: travel and traffic information, news, hazard warnings, etc.

Referring now to FIG. 1, promotional messages are created and prepared for broadcast 10. The messages may be digital or analog and may be compressed and otherwise encoded. The messages are broadcast 12 over the preferred commercial radio sub-carrier signal. The messages are received, stored and played 14 by UMEPs within the broadcast area of subcarrier transmission. Each transmission updates messages stored in a message memory of an individual UMEP. As previously mentioned, wireless transmission may be skipped if the invention is utilized by pre-loading messages into player memories, but the updateable broadcast is preferred.

Figure 2:
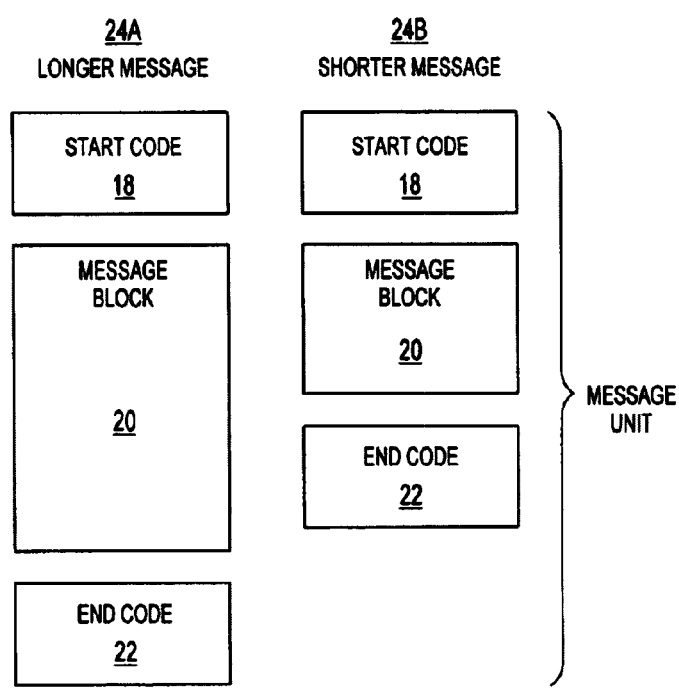
FIG. 2 illustrates preferred message unit arrangements.

It is expected that the messages will be produced in a recording studio. The messages will be recorded and, if necessary, compressed. FIG. 2 illustrates a preferred message structure. Messages may be of varying lengths. Each message structure includes a start code 18, message block 20 and an end code 22. The start code, message block and end code make up a message unit 24A (long) or 24B (short). Messages may be organized into groups for broadcast on different channels, at different times, in different geographic regions, etc. The messages also might include an additional database code to indicate the type of message, such that messages can be matched to music content to tailor the type of message to be played based upon the type of music which is being played.

Figure 3:
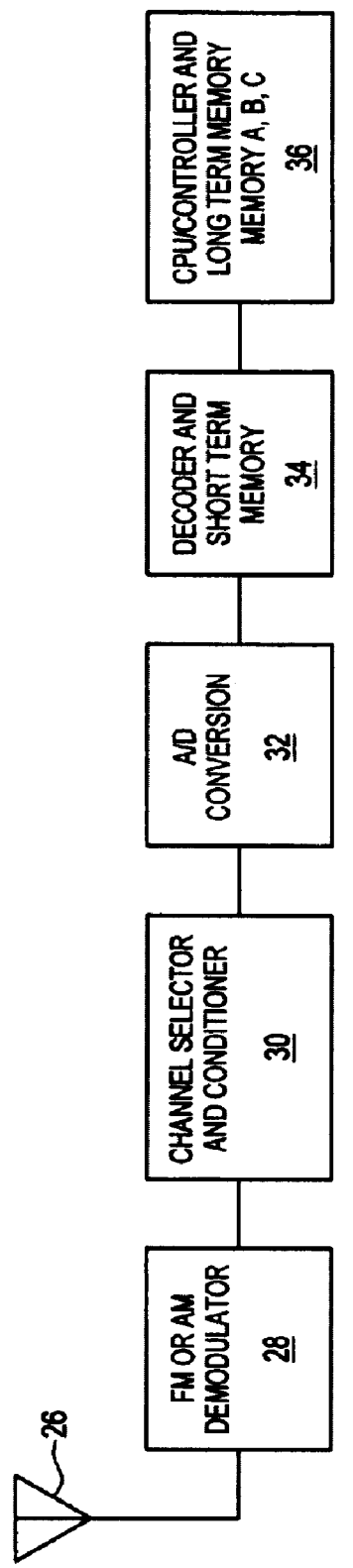
FIG. 3 is a block diagram of a preferred subcarrier message receiver of the invention.

According to the preferred embodiment of the invention, UMEPs include a sub-carrier receiver module, as seen in the FIG. 3 block diagram for a preferred sub-carrier receiver. Sub-carrier message broadcasts impinge upon an antenna 26, and the signals are demodulated by an appropriate demodulator 28, which may be AM or FM. The signal from the demodulator is sent to a channel selector and conditioner 30, which selects the sub-carrier message channel and prepares the signal, e.g., amplifies, for decoding by a decoder. An analog to digital converter 32 converts the message to digital form. The converter 32 is only required where an analog subcarrier signal is used for message transmission. Message data from the converter 32, or the channel selector 30 if no converter is necessary, is decoded by a decoder 34. Preferably, the decoder 34 includes a small amount of short term memory to temporarily store decoded messages. Such short term storage permits a CPU or controller board 36 to manage its long term memory in the event that a newly received message would cause a memory overflow. A newly decoded message, after any required long term memory management, is sent to long term memory associated with the controller 36, which serves as a message memory from which a message is played. The decoder 34 may be realized as part of the CPU or controller 36.

The channel selector 30 is preferably adjustable so that a UMEP including the sub-carrier messaging receiver may receive messages at different frequencies and modulations. This feature can be used to support different types of messaging contents on separate channels that can be selected by a user, selectively controlled by the controller 36 without user input, set at the time of manufacture, or set by dealers or technicians. The channel selector 30 may scan frequencies, may be directed to a frequency by a received control signal, or it may be set by a switch or other type of selector. The FIG. 3 receiver may also contain a digital signal processor (DSP) as a separate module or a function of the controller 36 if it is necessary to decompress or otherwise process received messages prior to storage or playing. It is preferred that the sub-carrier receiver be continually powered so that it is always enabled to receive message broadcasts, and accordingly, it should exhibit low power consumption.

Figure 4:
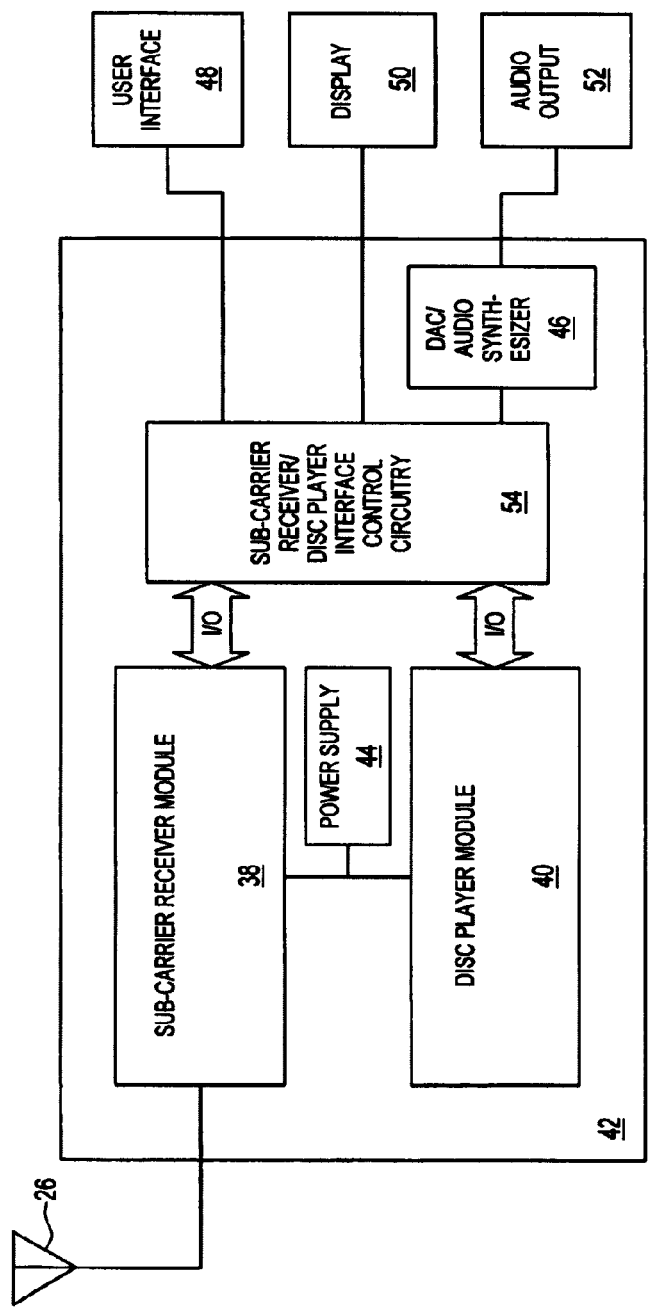
FIG. 4 illustrates a preferred updateable message enabled disc player of the invention.

A preferred UMEP including a subcarrier receiver module 38 constructed in accordance with FIG. 3 is shown in block form in FIG. 4. The FIG. 4 UMEP is a disc player, e.g., CD player. A disc player module 40 is completely conventional. Both modules are mounted on a main circuit board 42. The board 42 may be constructed so that both modules are integral to the board or in a way that permits the sub-carrier receiver module 38 to be present or not. This latter type of board construction permits the same board to be used for players that may be built without the sub-carrier receiver module.

The receiver module 38 and disc player module 40 preferably share some common components, including a power supply 44, DAC (digital to analog converter)/audio synthesizer 46, user interface 48, display 50, and audio output 52. The interaction between the modules and their use of common components is regulated by interface control circuitry 54. The interface control circuitry 54 may be part of the sub-carrier receiver module 38 so that it will not be present on the main board if the sub-carrier receiver module is not included. The interface control circuitry allows the disc player module 40 to receive input from the user interface 48, e.g., "stop", "start", "skip", volume control, etc. The display indicates such things as track number and duration. The interface control will also regulate access to the audio synthesizer 46. Preferably, the subcarrier receiver module 38 receives priority, so that its access to the synthesizer 46 pauses play of a track from the disc player module 40.

Figure 5:
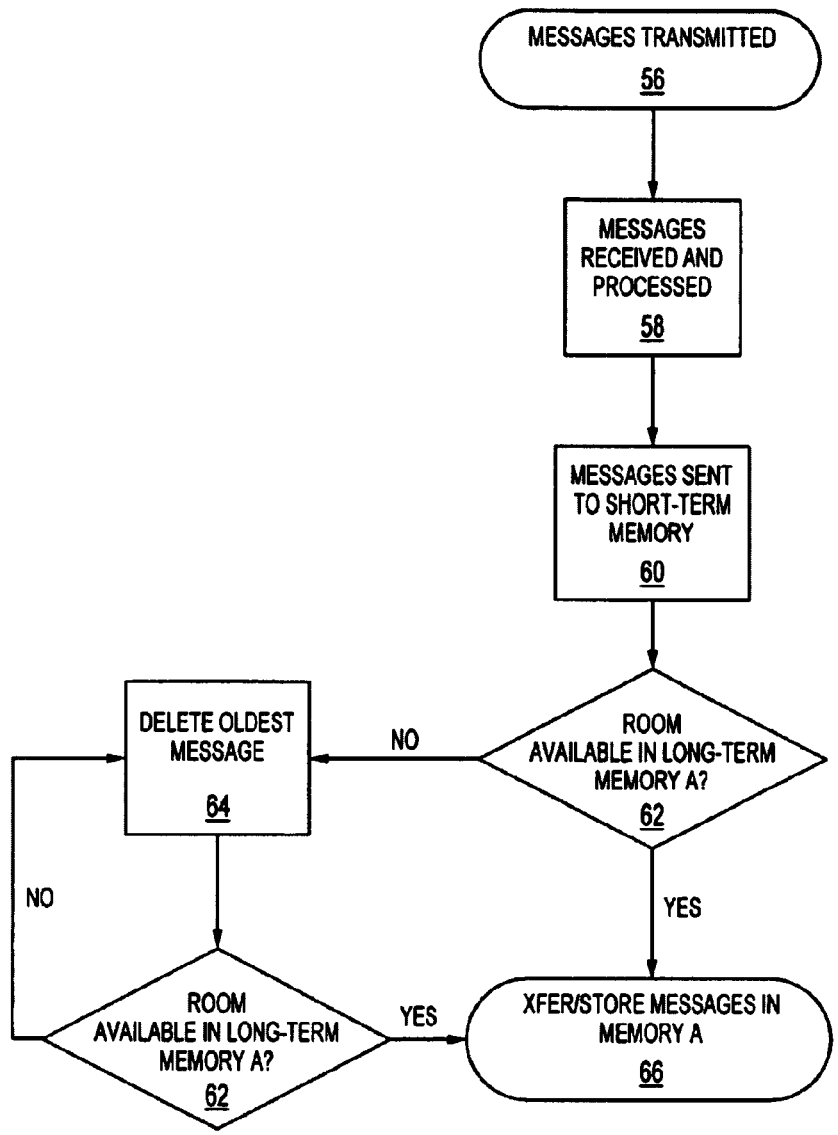
FIG. 5 illustrates a preferred message reception method of the invention.

FIG. 5 illustrates a preferred transmission and reception procedure executed with a broadcast and a UMEP for reception of messages according to the invention. A digital FM message broadcast is assumed in FIG. 5. A step for analog to digital conversion would be added to the FIG. 5 procedure if an analog messaging broadcast is utilized. In FIG. 5, a message is modulated onto the baseband signal of a digital FM broadcast and transmitted 56. The message is received and processed 58 by the sub-carrier receiver module 38 of a UMEP. The demodulated, audio or text message is sent 60 to short-term memory in the sub-carrier receiver module 38. The receiver module 38 should also contain enough long-term memory to hold and play a reasonable number of different messages between times when new messages are received.

The long-term memory may be full when a new message is received. Preferably, the controller 36 checks 62 to see if there is sufficient unused long-term memory referred to as Memory A, available to store new messages. If there is insufficient memory, the oldest messages are deleted 64 until enough space exists. When sufficient long-term memory is made available, the messages will be transferred from short-term memory to the long-term memory and stored 66 in sequential order based on when the messages were received.

Figure 6:
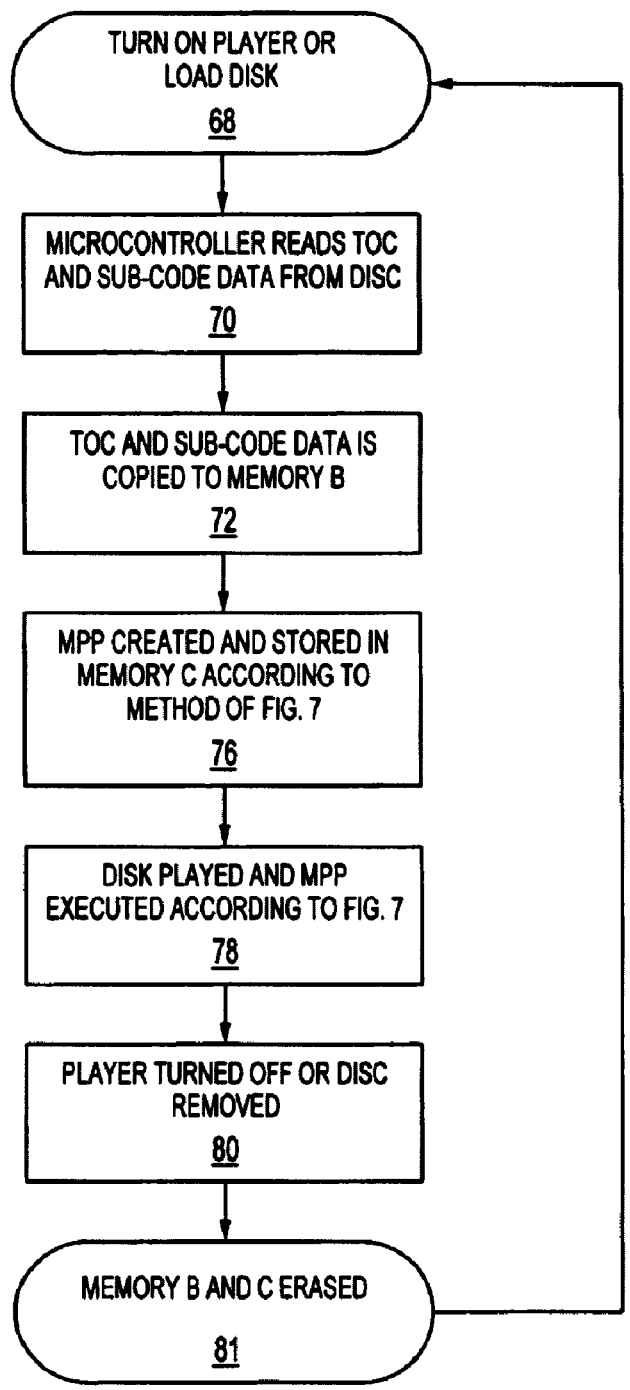
FIG. 6 illustrates preferred steps for initiating a message play plan.

Stored messages may be played from long term memory. Preferably, a plan is created. FIG. 6 illustrates a preferred timing for initiation of a Message Play Plan (MPP) that is created by the micro controller 36 in the UMEP disc player. The MPP determines when, how many and which messages will be played. The context of a user listening to the disc is utilized by the MPP to determine when a message should be played from memory. Thus, the process begins when the user turns on the player or loads 68 a disc. The micro controller queries the disk and reads 70 TOC and other control code data from the disc. This TOC and other control code data is stored 72 in memory, referred to as memory B. The MPP is created, as outlined in FIG. 7, and stored 76 in memory, referred to as memory C. The disc is played and the MPP is executed 78 as outlined in FIG. 8. The MPP stops when the player is turned off or the disk removed 80. Turning off the player or removing the disk also erases 81 memory B and C that, respectively, contain the TOC and sub-code data, and the MPP. The MPP process starts again when the player is turned on or a new disc loaded.

Figure 7:
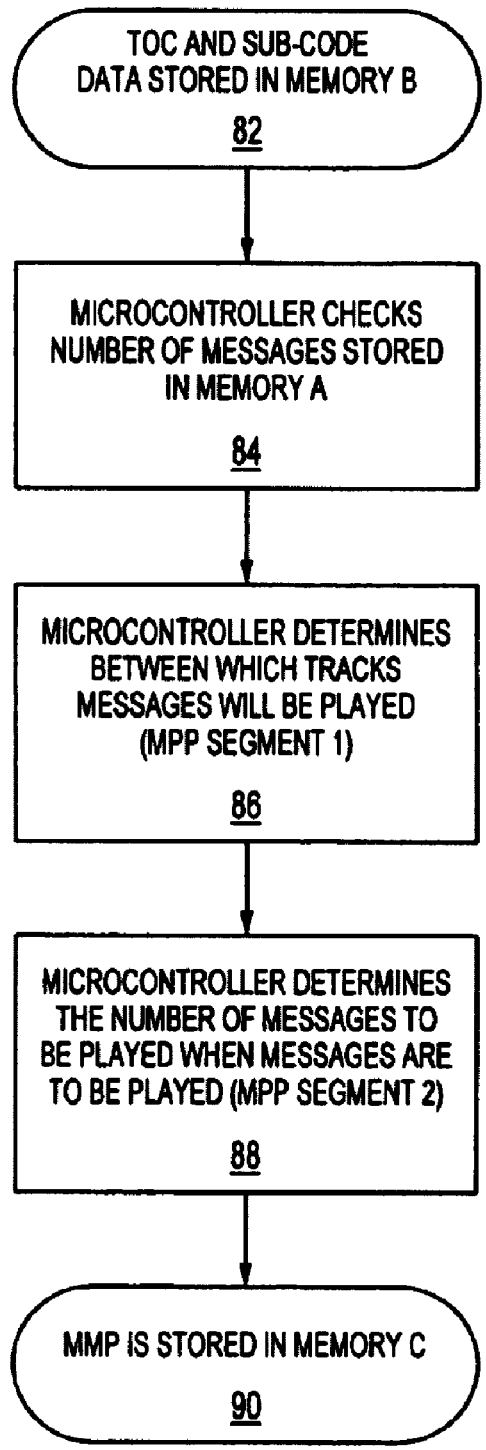
FIG. 7 illustrates preferred steps for creating a message play plan.

FIG. 7 illustrates steps in a preferred MPP. The MPP begins 82 after the controller 36 has stored the TOC and sub-code memory B. The controller 36 checks 84 the number of messages that are stored in memory A. The controller 36 then determines 86 which tracks will have messages played between them. The determination of which tracks will trigger messages to be played should be somewhat random to prevent a listener from being able to anticipate and bypass a message. It may be desirable, though, to always play a message either before the first track, after the first track, or after the second track to maximize the chance that a listener will hear a message during every listening session, even short ones. The controller 36 next determines 88, based on how many messages are stored in memory A and how many message breaks have been determined, the number of messages to play at each break. The determination of the number of messages to play may also include an intelligent selection of which messages to play. A way to determine the type of messages to be played is to link the type of messages to the content of the music track which was played or will be played. Typical digital media include track titles in code information on the digital media, such as the TOC on a CD. This provides an opportunity to base the message played upon the type of music. For example, if the music file belongs to a certain music category, the message structure can be set up to play a specific message for each music category. This way, the choice of messages played can match more closely with the listener's taste as it is reflected by the music category, which adds an additional and powerful dimension in the customization of advertisements to listeners. In such a case, the MPP would include information linking tracks to particular types of messages. A completed MPP is stored 90 in memory C.

Figure 8:
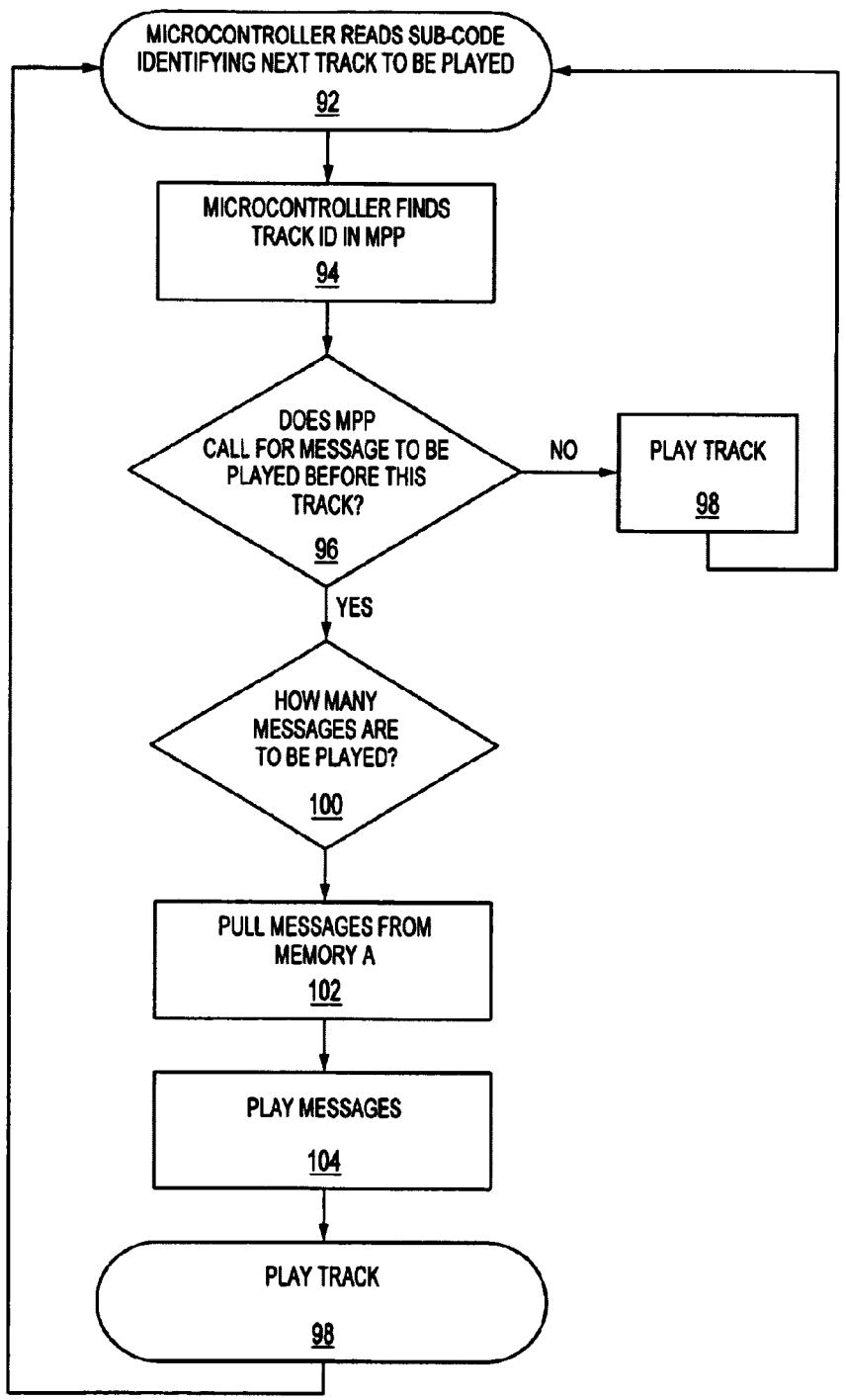
FIG. 8 illustrates preferred steps for executing a message play plan.

FIG. 8 details a preferred sequence for launching a stored MPP during playback of a disc. The controller identifies 92 the next track on the disc through use of control codes while the prior track is being played, or immediately upon its conclusion. The ID number of the identified next track is compared 94 to the MPP. The MPP is queried 96 to determine whether a message is to be played before the identified next track If the answer is no, the track is played 98 and the next track is identified 92. If the answer is yes, the MPP is queried 100 for how many messages are to be played. The MPP also may return information on which messages are to be played based upon the track to be played or the track which was played. The appropriate number and ones of messages are then pulled 102 from memory A and played 104. Following the messages, the track is played 98, and the sequence begins anew to identify the next track 92.

From the preferred embodiment, artisans will appreciate various advantages of the invention and that modifications may be made to the invention without departing from the scope of the invention. The invention permits advertising or promotional messages to be broadcast to digital audio media players via wireless transmission. Received messages are stored by capable UMEP devices and stored messages are played through the audio output of the UMEP devices.

The general features of the preferred embodiment and variations thereof also provide a unique promotion method. Advertisers are especially interested in targeting their messages to particular audiences. The demographics of CD users provides a basis for targeting the users to particular advertising messages. For example, people who use portable disc players tend to be heavy CD purchasers. Accordingly, the invention offers record companies and their advertisers the opportunity to get their message to this highly desirable group of CD listeners.

A preferred embodiment record company promotion method has a UMEP messaging provider contract with a recording company. This method could apply, however, to any advertiser who wants to reach people who use portable disc players. The provider produces or arranges for the production UMEPs, that preferably prominently displays the logo, name, etc. of a recording company, recording, band, concert, etc. The UMEPs are then distributed to the targeted audience. In a preferred embodiment, UMEPs are given away for free or for a nominal charge as a tie-in to a related purchase (e.g., concert tickets, CD's, clothing, etc.). The provider then broadcasts messages to the sub-carrier enabled disc players that promote the recording company, recording, band, concert, etc. These messages preferably include samples of music, since the UMEP is well suited to present such samples. The provider maintains the message broadcasts to the disc players for a defined period of time after which they stop. The provider might then provide the same service to another company, such as a clothing company, assuming that the original contract does not prohibit such messaging to the UMEPs distributed by an initial agreement. Messages can be broadcast to a select group of players by either coding the messages, broadcasting different messages over different frequencies or modulations and equipping certain players to receive the selected frequency or modulation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A wireless messaging method for use with recorded digital audio media played in digital audio media players, the method comprising steps of:
   providing a promotional, informational or instructional message broadcast to digital audio media players;
   then, within a digital audio media player,
   receiving promotional, informational or instructional messages as a result of said step of providing,
   storing received promotional, informational or instructional messages within the digital audio media player; and
   playing a stored promotional, informational or instructional message according to a message play plan in response to a playback operation of the digital audio media on the digital audio media player.

2. The method according to claim 1, wherein said playback operation comprises a track end.

3. The method according to claim 2, wherein a random number of messages are played by said step of playing in response to a playback operation of the digital audio media player.

4. The method according to claim 1, further comprising a step of converting, after said step of receiving, a received message if the message is in analog format.

5. The method according to claim 1, wherein said step of storing comprises:
   initially storing a received message in short term memory;
   checking long-term memory to see if space is available for the received message, then, if space is available for the received message, transferring the received message to long-term memory, else, freeing space in long-term memory and then transferring the received message to long-term memory.

6. The method according to claim 5, wherein said step of storing frees space in long-term memory by deleting messages beginning with oldest messages until enough space exists for the received message.

7. The method according to claim 1, wherein said step of playing includes a steps of forming the message play plan to determine how many messages should be played from memory in response to a playback operation.

8. The method according to claim 7, wherein said step of playing includes a step of launching the message play plan.

9. The method according to claim 8, wherein said step of forming a message play plan comprises:
   reading control code data from a digital audio medium in the player;
   storing control code data, wherein the control code indicates, at least, break locations between tracks;
   executing the message play plan; and
   erasing control code data when either the digital audio medium in the player is removed or the player is turned off.

10. The method according to claim 9, wherein said step of forming a message play plan further comprises:
    checking memory to determine a number of messages stored therein;
    determining, using the control code data, tracks on the digital audio medium that will have messages played between them; and
    determining, based on the number of messages stored in memory and the number of breaks between tracks indicated by control code data, a number of messages to play at each break between tracks.

11. The method according to claim 10, wherein the step of determining, using the control code data, tracks on the digital audio medium includes randomness.

12. The method according to claim 10, wherein said step of launching a message play plan comprises:
    identifying, using control code data, a next track on the digital audio medium to be played;
    using the message play plan to determine if a message is to be played before the next track, then, if no message is to be played, returning to said step of identifying, otherwise, determining the number of messages to be played from the message play plan, and pulling that number of messages from memory and playing the messages pulled from memory prior to the next track.

13. The method according to claim 1, wherein said playback operation is a track end and said step of playing includes selecting a message from memory based upon a track title.

14. A wireless messaging promotion method for use with recorded digital audio media played in digital audio media players, the method comprising steps of:

arranging distribution of portable digital audio media players capable of playing digital audio media, receiving promotional, informational or instructional messages from a wireless broadcast, storing received promotional, informational or instructional messages in a digital audio media player, and playing a stored promotional, informational or instructional message according to a message play plan in response to a playback operation of the digital audio media on the digital audio media player to a target group of people;

providing a promotional, informational or instructional message broadcast to digital audio media players distributed in said step of distributing.

15. The method according to claim 14, further comprising a step of arranging manufacture, prior to said step of distributing, of digital audio media players to be distributed in said step of distributing.

16. The method according to claim 15, wherein said step of arranging includes arranging for marking of digital audio players to be distributed with promotion indicia.

17. The method according to claim 14, wherein the messages promote music and include music samples.

18. The method according to claim 14, wherein said step of arranging comprises distributing to at least two target groups of people and said step of providing comprises providing a separate broadcast to digital audio players distributed to separate target groups of people.

19. The method according to claim 18, wherein digital audio media players having different receiving channels are distributed to separate target groups of people and the separate broadcast is achieved by using separate channels.

20. The method according to claim 18, wherein separate target groups of people are geographically separated and the separate broadcast is achieved by geographic separation between broadcasts.

21. A wireless message receiving and playing digital audio media player comprising:

a digital audio medium module which plays digital audio media;

a wireless receiver module which receives promotional, informational or instructional messages from a wireless broadcast, stores received promotional, informational or instructional messages, and outputs stored promotional, informational or instructional messages according to a message play plan in response to a playback operation of the digital audio media by the digital audio medium module;

an audio output which produces audio in response to playing of digital audio media or outputting of promotional, informational or instructional messages from memory;

an interface to interface the audio output to the digital audio medium module and the wireless receiver module.

22. A messaging method for use with recorded digital audio media played in digital audio media players, the method comprising steps of:

loading, by receiving from a wireless broadcast, promotional, informational or instructional messages into memory of digital audio media players;

then, within a digital audio media player, storing promotional, informational or instructional messages received from said step of loading within the digital audio media player; and playing a stored promotional, informational or instructional message according to a message play Plan in response to a playback operation of the digital audio media on the digital audio media player.

23. The method according to claim 22, wherein said playback operation is a track end and the message play plan selects a promotional, informational or instructional message from memory based upon a track title.

* * * * *

UNITED STATES PATENT AND TRADEMARK OFFICE
CERTIFICATE OF CORRECTION

PATENT NO. : 7,046,956 B1 Page 1 of 1
APPLICATION NO. : 09/590489
DATED : May 16, 2006
INVENTOR(S) : Marc S. Cohen It is certified that error appears in the above-identified patent and that said Letters Patent is hereby corrected as shown below:

In the Issued Patent:

Column 8, line 24, after "includes a" please delete "steps", and insert --step-- therefor.

Signed and Sealed this

Seventh Day of August, 2007

JON W. DUDAS
*Director of the United States Patent and Trademark Office*